United States Patent [19]

Katz

[11] 3,926,201
[45] Dec. 16, 1975

[54] METHOD OF MAKING A DISPOSABLE DENTAL FLOSS TOOTH PICK

[76] Inventor: Harry Selig Katz, 785 Pleasant Valley Way, W. Orange, N.J. 07052

[22] Filed: Nov. 17, 1972

[21] Appl. No.: 307,478

[52] U.S. Cl................................ 132/91; 264/157
[51] Int. Cl.² .................................... A61C 15/00
[58] Field of Search ............ 132/91; 264/157, 251; 249/97

[56] References Cited
UNITED STATES PATENTS

| | | | |
|---|---|---|---|
| 2,180,522 | 11/1939 | Henne | 132/91 |
| 2,187,899 | 1/1940 | Henne | 132/91 |
| 2,443,415 | 6/1948 | Buscarino | 132/91 |
| 2,702,555 | 2/1955 | De Mar | 132/91 |
| 2,736,327 | 2/1956 | Schlicksupp | 132/91 |
| 3,415,924 | 12/1968 | Girardi | 264/251 |
| 3,769,396 | 10/1973 | Espinosa | 264/157 |

Primary Examiner—Robert Peshock
Assistant Examiner—J. Q. Lever

[57] ABSTRACT

A method of making a disposable dental floss tooth pick in which a plurality of individual U-shaped handles are molded about a single elongated dental floss filament after the molding operation the units are separated to form individual dental floss tooth picks.

5 Claims, 4 Drawing Figures

METHOD OF MAKING A DISPOSABLE DENTAL FLOSS TOOTH PICK

BACKGROUND OF THE INVENTION

1. Field of the Invention

This invention relates to a disposable dental floss tooth pick, and more particularly to a low cost, unitary, plastic disposable dental floss tooth pick that can be manufactured by automated molding methods as described herein.

2. Description of the Prior Art

The daily use of dental floss is desirable for a number of reasons. It is a means of cleaning between the teeth and under gum margins so that bacterial or dental plaque is removed. Dental authorities consider plaque the leading cause of periodontal disease and tooth loss in adults. Also, dental floss is the best means for removal of food particles between the teeth after eating. The trapped particles are annoying, may interfere with proper speech, and when permitted to remain may cause bad breath. The standard wood or plastic tooth picks that are usually used for this purpose have a number of shortcomings, among them the tendency to break during use, sharp edges may cut into the gums and cause bleeding, and the leading point is often too thick too dislodge particles from narrow spaces between teeth.

A search of the prior art in this field reveals that dental floss holders have generally been rigid slotted Y-shaped members. The following patents represent the state of the art: U.S. Pat. Nos. 1,815,408, 2,433,415, 2,664,093, 3,631,869, and 3,642,011. Some of these patents have provided unitary tooth pick members which hold a supply of elongated dental floss and enables the user to bring a fresh piece of dental floss into ready position after the first length of floss has been used. Others are designed to be disposable in design but carry the burden of a very complex and expensive structural configuration. For this and other reasons which will become apparent upon perusal of the pick articles described in the aforementioned patents, satisfactory disposable dental floss tooth picks have not appeared on the commercial market.

BRIEF SUMMARY OF THE INVENTION

An object of the present invention is to provide a loss-cost disposable dental floss tooth pick which can be produced by automated molding techniques.

Another object of this invention is to provide a unitary, disposable dental floss tooth pick in which the dental floss is embedded across the opening of the pick.

Still another object of this invention is to provide a plastic, disposable dental floss tooth pick a method of making a plurality of disposable, dental floss tooth picks simultaneously by an economical molding procedure.

Yet another object of the invention is to provide a method of manufacture of the tooth pick article described herein in which the dental floss is embedded into the arms of the pick body but remains clean after manufacture A feature of the present invention is the provision of a molding process for making a disposable, dental floss tooth pick article in which a rubber insert is positioned within the mold cavity to prevent liquid plastic from onto the floss during the molding process.

DESCRIPTION OF THE INVENTION

These and other objects and features of the invention will be made apparent from the following more particular description of the invention, in which reference will be made to the accompanying drawings, in which.

Figure 1:
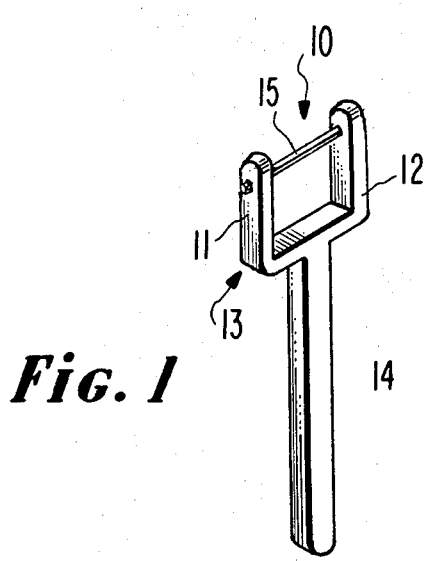
FIG. 1 is a view of the disposable, dental floss tooth pick article of the present invention.

Referring now to the drawings illustrated herein, and with particular attention to FIG. 1, there is shown in schematic illustration the disposable, dental floss tooth pick article of the present invention, given reference numeral 10. The pick article includes a pair of arms or prongs 11 and 12 in a unitary structure forming a generally U-shaped element, referred to as 13. A handle 14 is attached to the article at the curved position of element 14, by means of which the user can conveniently use the floss pick by applying the floss between the teeth, and then wiping the floss with a napkin.

A short length piece of dental floss 15 is stretched across the open end of the U-shaped element 13 and embedded into arms 11 and 12 at their extremities.

Figure 2:
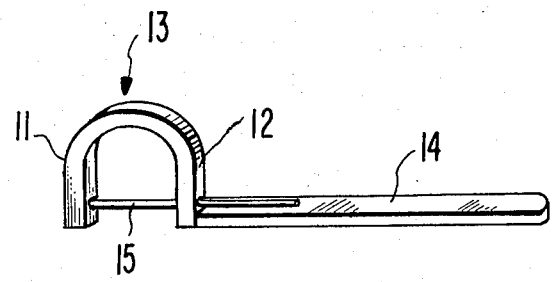
FIG. 2 is a view showing another embodiment of the article of the invention.

While the handle is shown attached generally parallel to the arms of the pick forming a Y-shaped article, a transverse geometrical configuration also may be employed as shown in FIG. 2. In this arrangement the handle is more nearly parallel to the dental floss string across the arms.

Figure 3:
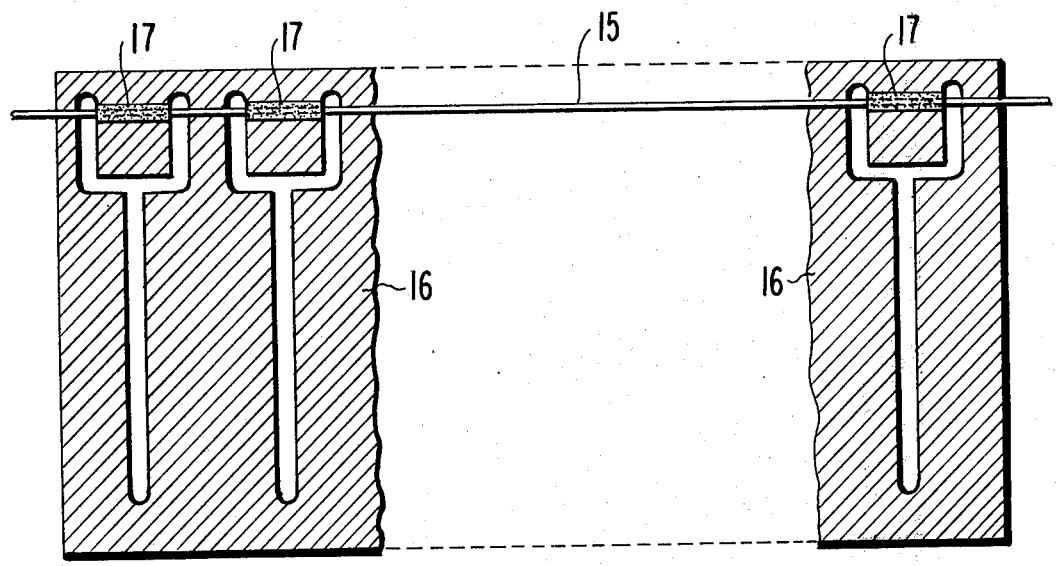
FIG. 3 is an illustration of the process of manufacture of the article described herein in which is shown a plurality of tooth picks articles being made simultaneously.
Figure 4:
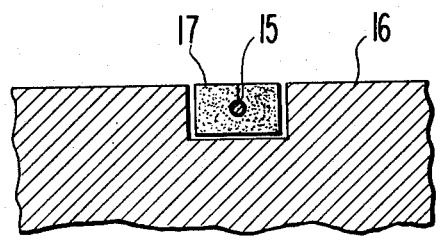
FIG. 4 is another view to show the relative position of mold, rubber insert and dental floss.

FIG. 3 shows a manufacturing technique whereby a plurality of pick articles may be produced simultaneously. A mold 16 contains a plurality of cavities containing the impression of the pick configuration desired. Stretched across the bottom plate of the mold is an elongated floss 15 which is positioned over the pick cavities. Within the cavities is a rubber insert element 17 which is high-strength and high-temperature resistant, such as General Electric RTV 630 Silicone Rubber or DuPont Viton A. FIG. 4 shows the manner of retaining the rubber insert in the mold. The surface of the floss is slightly above the top surface of the metal mold so that when the mold is closed, the floss will be tightly surrounded by the rubber insert. The plastic material of the pick article then is poured or injected into the mold cavity. The pick thus is formed with the floss at the extremities of the arms of the pick. Significantly the floss itself protected by the rubber insert, remains clean after the molding process has been completed.

While we have discussed the article and process of the invention with reference to certain embodiments, others may be used as well. For example, the picks may be molded in the manner described but without the dental floss embedded during the molding process. In this embodiment, a recess is provided in the extremities of the arms of the pick. Then the floss is bonded onto the arms in the area of the recesses, preferable with an additional bonding fixture that will prevent the bonding adhesive from flowing onto the sides of the arms.

What is claimed is:

1. A method of making a disposable dental floss tooth pick having a pair of arms forming a generally U- shaped element, a handle attached to said element and a short-length piece of dental floss strung across the extremities of said arms and embedded therein which comprises the steps of:

providing a plurality of said U-shaped elements having said handle attached thereto with the extremities of said arms generally aligned, stretching an elongated dental floss filament across extremities, embedding said floss into said arms, and cutting the floss at the ends of each of said picks.

2. A method according to claim 1 wherein said arms are provided with recesses into which said floss is embedded.

3. An array of disposable dental floss tooth pick members, each of said members comprising a pair of arms forming a generally U-shaped element and a handle attached to said element, said members being arranged in a row with one of said arms being positioned adjacent the arm of the next element and a long length piece of dental floss extending through all of said arms and embedded into said arms.

4. An array according to claim 3 wherein said handle forms a planar Y-shaped pick member with said arms.

5. A method of making a disposable dental floss tooth pick having a pair of arms forming a generally U-shaped element, a handle attached to said element and a short-length piece of dental floss strung across the extremities of said arms and embedded therein which comprises the steps of having rubber inserts for forming a plurality providing a mold cavity of said U-shaped elements having said handle attached thereto with the extremities of said arms generally aligned simultaneously stretching an elongated dental floss filament across said extremities, flowing plastic into said mold thereby forming said elements having said floss embedded into said arms, and cutting the floss at the ends of said elements.

* * * * *